(12) United States Patent
Chatragadda (10) Patent No.: US 12,454,390 B2
(45) Date of Patent: Oct. 28, 2025

(54) METHOD OF DIVIDING AND TRANSFERRING THE SEMI-SOLID TYPE FOOD IN PET FOOD CANS INTO EQUAL PORTIONS WITHOUT USING A KNIFE OR OTHER KITCHEN TOOLS

(71) Applicant: Anka Rao Chatragadda, Lincoln, RI (US)

(72) Inventor: Anka Rao Chatragadda, Lincoln, RI (US)

( * ) Notice: Subject to any disclaimer, the term of this patent is extended or adjusted under 35 U.S.C. 154(b) by 114 days.

(21) Appl. No.: 18/378,048

(22) Filed: Oct. 9, 2023

(65) Prior Publication Data
US 2024/0083631 A1    Mar. 14, 2024

(51) Int. Cl.
*B65D 25/04* (2006.01)
*B26B 3/04* (2006.01)
*B26B 5/00* (2006.01)

(52) U.S. Cl.
CPC ............... *B65D 25/04* (2013.01); *B26B 3/04* (2013.01); *B26B 5/008* (2013.01)

(58) Field of Classification Search
CPC .. B65D 25/04; B65D 3/24; B26B 3/04; B26B 3/00; B26B 29/06; B26B 5/008
USPC ....... 222/80; 99/537; 30/114, 173, 287, 289, 30/290, 302, 303, 315
See application file for complete search history.

(56) References Cited

U.S. PATENT DOCUMENTS

| | | | |
|---|---|---|---|
| 5,101,718 A * | 4/1992 | Lin ......................... | B26D 3/26 99/545 |
| 5,446,965 A * | 9/1995 | Makridis ................ | A21C 15/04 30/337 |
| 7,480,999 B2 * | 1/2009 | Atwater ................... | B25G 1/00 30/316 |
| 2006/0182861 A1 * | 8/2006 | Arend ...................... | B26D 3/08 426/518 |

* cited by examiner

*Primary Examiner* — David J Walczak (57) ABSTRACT

A method is disclosed for dividing semi-solid pet food contained within a can into equal portions and transferring said portions into a reusable container without the use of knives or other kitchen utensils. The method utilizes a specifically designed container comprising an array of internal partitioning blades and ergonomic finger gaps to facilitate hands-free, hygienic food division and transfer. The container enables precise and repeatable portioning of veterinarian-prescribed or over-the-counter canned pet food, thereby supporting consistent feeding regimens and mitigating risks associated with overfeeding or underfeeding. The container is further configured for refrigerator, microwave, and dishwasher compatibility, addressing concerns related to odor retention, moisture accumulation, and reheating. The method and container are additionally applicable to human-grade canned foods and other soft food products requiring equal portioning and hygienic storage.

2 Claims, 7 Drawing Sheets

METHOD OF DIVIDING AND TRANSFERRING THE SEMI-SOLID TYPE FOOD IN PET FOOD CANS INTO EQUAL PORTIONS WITHOUT USING A KNIFE OR OTHER KITCHEN TOOLS

CROSS-REFERENCE TO RELATED APPLICATIONS

This application claims the benefit of U.S. Provisional Patent Application No. 63/431,375, filed Dec. 9, 2022, pursuant to 35 U.S.C. § 119 (e), the entire disclosure of which is hereby incorporated by reference herein in its entirety.

This application also claims priority under 35 U.S.C. § 119 (e) to U.S. Design patent application Ser. No. 29/904,532, filed Oct. 9, 2023, the entire disclosure of which is hereby incorporated by reference herein in its entirety

FIELD OF THE INVENTION

The present disclosure relates to a method for dividing semi-solid pet food contained within a pet food can into equal portions and transferring the divided portions from the can into a container. The container is manufactured in accordance with the design disclosed in U.S. Design patent application Ser. No. 29/904,532, referenced in cross-reference section.

BACKGROUND OF THE INVENTION

The present invention relates to methods of feeding prescription diets to companion animals afflicted with chronic health conditions, wherein the feeding regimen is determined based on the animal's body weight and the veterinarian-prescribed food portion. More specifically, the disclosure pertains to prescription diets and regular pet foods provided in canned, semi-solid form. At present, pet owners must manually divide the semi-solid food contained within a can into accurate, predetermined portions corresponding to the veterinarian's recommendation. This process is required each time a new can of prescription or over-the-counter (OTC) food is opened. Manual portioning of semi-solid canned pet food is inherently imprecise, as visual estimation or manual division fails to provide consistent, uniform portions. Such inaccuracies can result in underfeeding, potentially causing malnutrition, or overfeeding, potentially leading to obesity and associated health complications.

The conventional method described in paragraph often leads to user dissatisfaction, as pet owners are generally unable to serve consistently sized portions during each feeding. This inconsistency results from the need to manually divide the semi-solid food supplied in canned form—a process that lacks the precision and repeatability necessary to produce uniform or equal portions.

Due to concerns related to odor and hygiene, pet owners may be reluctant to store partially used, lid-opened pet food cans in household refrigerators alongside human food items.

Additionally, conventional pet food cans available in the market are typically constructed from metal materials, which are not microwave safe. In contrast, the container manufactured in accordance with the design disclosed in paragraph [0002] is composed of microwave, refrigerator and dishwasher safe materials, allowing for convenient reheating of stored food portions.

Accurate portioning of meals is a critical aspect of feeding companion animals, particularly when following a veterinarian-prescribed diet. In current practice, pet owners frequently attempt to divide canned pet food into equal portions by visually estimating the quantity, commonly referred to as "eyeballing." Alternatively, food may be divided manually using bare hands, a method that lacks precision, consistency, and hygiene. This manual portioning must be repeated at each feeding occasion upon opening a new can of pet food. Such conventional approaches often result in inconsistent portion sizes and introduce several challenges, as further described herein.

A first problem associated with conventional portioning methods is the risk of feeding the pet an incorrect or inconsistent meal size—either less than, more than, or unequal to the veterinarian-recommended portion. Repeated underfeeding may result in malnutrition, while consistent overfeeding may lead to obesity. This issue is particularly critical for pets on prescription diets, where accurate portion control is essential for managing chronic health conditions as prescribed by a veterinarian.

A second problem arises when it becomes necessary to refrigerate leftover pet food in its original can. Storing open pet food cans in a household refrigerator often results in the transfer of pet food odor to the surrounding environment, which can be undesirable. This issue is particularly problematic for pet owners who are sensitive to such odors and prefer to avoid storing open cans in close proximity to human food items.

A third problem arises when leftover pet food is stored in its original can without a proper seal and placed in a household refrigerator. In such cases, exposure to the refrigerated environment can result in moisture accumulation within the can, which may adversely affect the texture, quality, and palatability of the remaining food.

A fourth problem arises when there is a need to reheat pet food stored in its original can. Most commercially available pet food cans are constructed from metal, rendering them unsuitable and unsafe for use in microwave ovens. As a result, users must transfer the food to a separate, microwave-safe container, adding inconvenience and increasing the potential for contamination or food waste.

The container design disclosed in paragraph [0002]provides a unique plastic container configured to address the problems identified in paragraphs [0008] through [0012]. The container enables portioning, storage, and reheating of semi-solid pet food in a hands-free and hygienic manner, thereby improving accuracy, convenience, and user experience & satisfaction.

The container design disclosed in paragraph [0002] also gives rise to a byproduct method for dividing semi-solid pet food contained in a can into equal portions and transferring the divided portions into the container referenced in paragraph [0013] in an efficient and user-friendly manner.

The present disclosure relates to a unique, step-by-step method enabled through the use of the container disclosed in paragraph [0002]. The method facilitates the division and transfer of semi-solid pet food into equal portions in a hygienic, efficient, and repeatable manner.

The basic structure of the container is a cylinder with one circular end open (top) and one circular face closed (bottom). The remaining sidewall and bottom circular face have an equal thickness. At the top of the sidewall, there are six equally-spaced rounded gaps to allow users to grasp an inserted food can with their fingers. Within the cavity formed by the sidewall and circular face, there are three intersecting blades attached to the center of the bottom circular face. The length of each blade is roughly the same as the inside diameter of a standard food can. The intersecting blades make an asterisk shape with six spokes. There is a gap between the end of each spoke and the inside of the cylinder sidewall, which allows a food can to be inserted into the container and enables the contents of the can to be divided into six equal parts. There is a round cap with a lip long enough to cover the rounded gaps at the top of the cylinder and fully close the cylindrical container with the divided food inside.

BRIEF DESCRIPTION OF THE DRAWINGS

FIGS. 3 to 5 illustrate general preparatory steps required to open the lid of a pet food can. These actions are shown for illustrative purposes only and are not claimed as part of the present invention.

DETAILED DESCRIPTION OF THE INVENTION

The present invention pertains to a method for dividing the contents of a pet food can into equal portions and subsequently transferring the divided portions into a specialized container.

Figure 1:
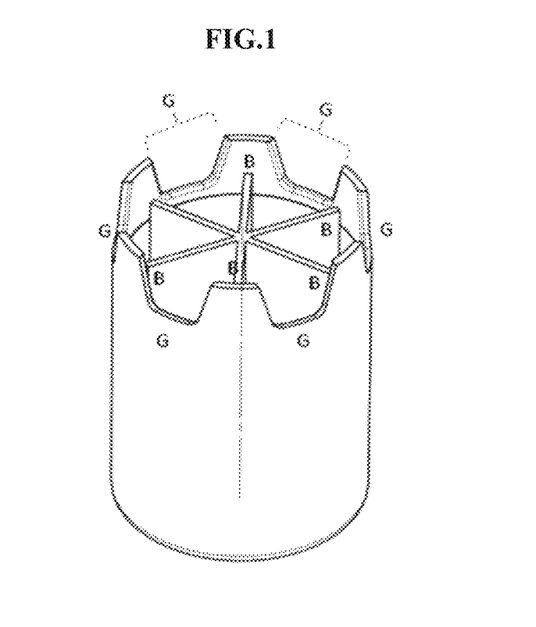
FIG. 1 illustrates a perspective view of the container manufactured in accordance with the design disclosed in the design patent application referenced in paragraph [0002].
Figure 2:
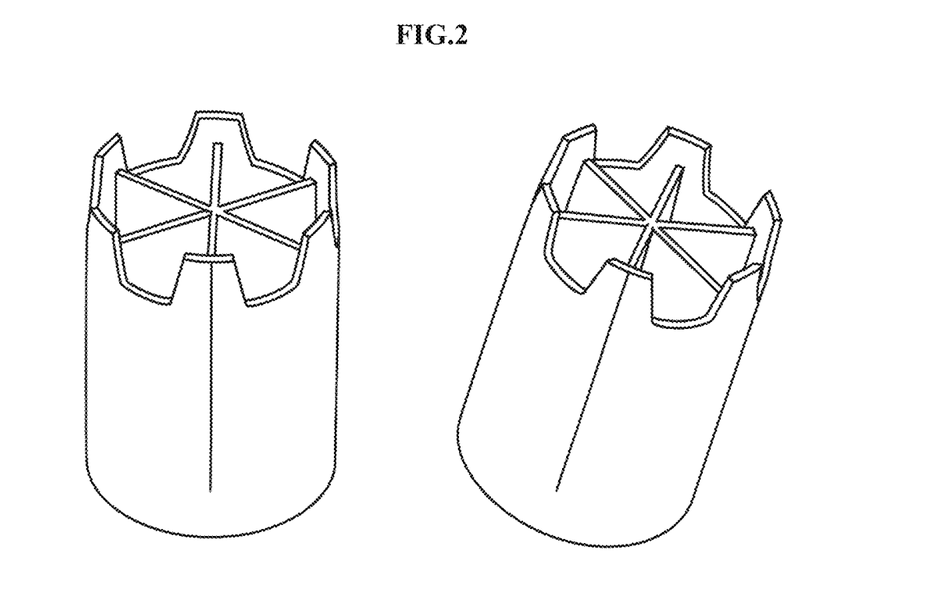
FIG. 2 illustrates standing and slightly tilted views of the fully functional container manufactured in accordance with the design disclosed in the design patent application referenced in paragraph [0002].

The container is manufactured in accordance with the design disclosed in the non-provisional patent application referenced in paragraph [0002]. Illustrations of the aforementioned container are provided in FIGS. 1 and 2.

The specialized container includes an outer cylindrical wall having a closed bottom and an open top with a plurality of blades inside the container and extending from the closed bottom. The blades divide an inner volume of the container into a plurality of equal portions. Outer edges of the plurality of blades B are spaced from an inner surface of the outer cylindrical wall such that a can of pet food can be inserted into the container as shown in FIGS. 7-11. An upper edge of the outer cylindrical wall includes a plurality of finger gaps G such that a user may grasp the can of pet food after the can has been fully inserted to the container.

Figure 3:
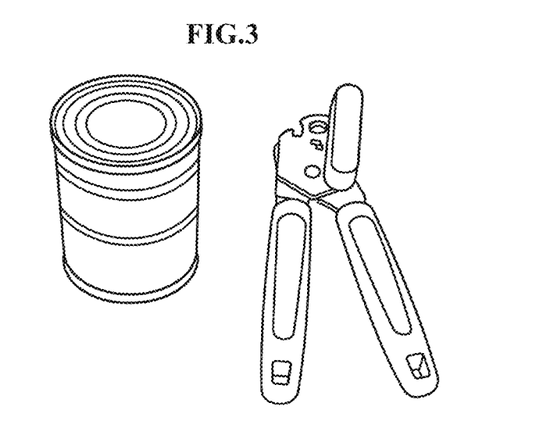
FIG. 3 illustrates a pet food can alongside a lid opener.
Figure 4:
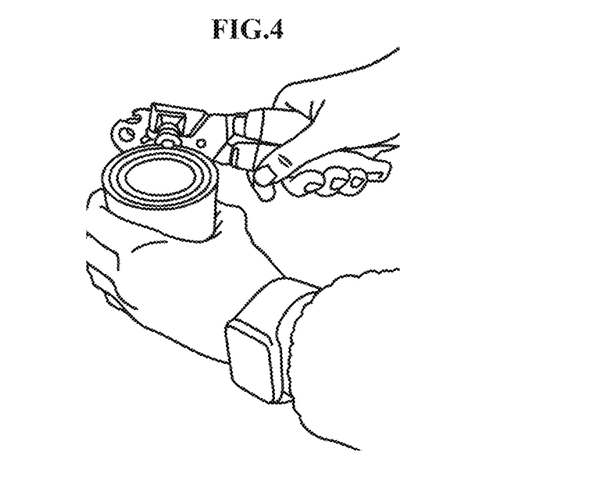
FIG. 4 illustrates a user opening the lid of the pet food can using the lid opener.
Figure 5:
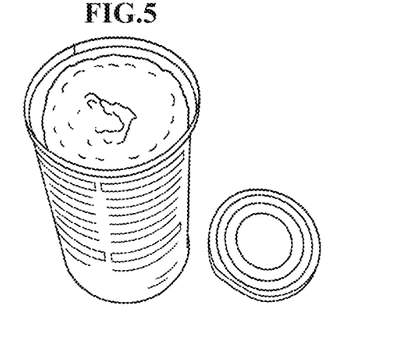
FIG. 5 illustrates the pet food can with the lid fully removed.
Figure 6:
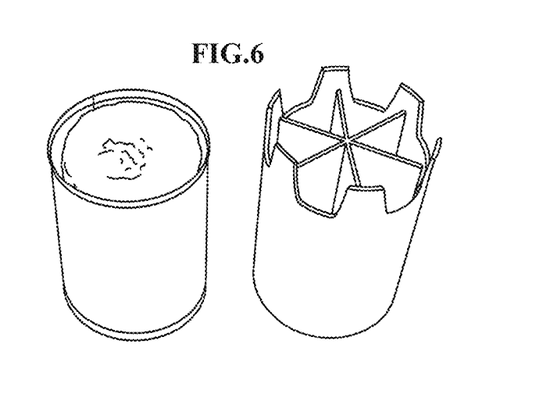
FIG. 6 illustrates a side-by-side view of the lid-opened pet food can and the container manufactured in accordance with the design disclosed in paragraph [0002].

The actions illustrated in FIGS. 3, 4, and 5 depict commonly practiced steps for removing the lid from a pet food can. These steps are not considered part of the method claimed in the present invention.

The actions illustrated sequentially in FIGS. 7 through 17 collectively demonstrate a novel method for cutting or dividing the contents of a pet food can and transferring the portions into the container—without the use of a knife or other kitchen utensils. The container is manufactured in accordance with the design disclosed in the non-provisional patent application referenced in paragraph [0002].

The novel method disclosed in the present invention comprises performing the actions illustrated in FIG. 7 through FIG. 17 in the same sequence.

FIGS. 3, 4, and 5 illustrate the process of opening the lid of a pet food can.

Figure 7:
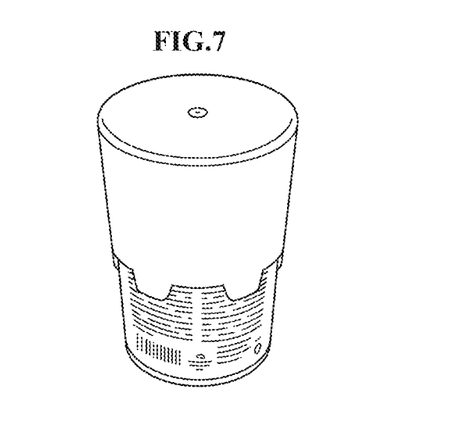
FIG. 7 illustrates the container placed upside down on top of the lid-opened pet food can.

Following the step described in paragraph [0041], the container described in paragraph [0037] is placed upside down over the opened pet food can, as described in paragraph [0039]. This action is illustrated in FIG. 7.

Figure 8:
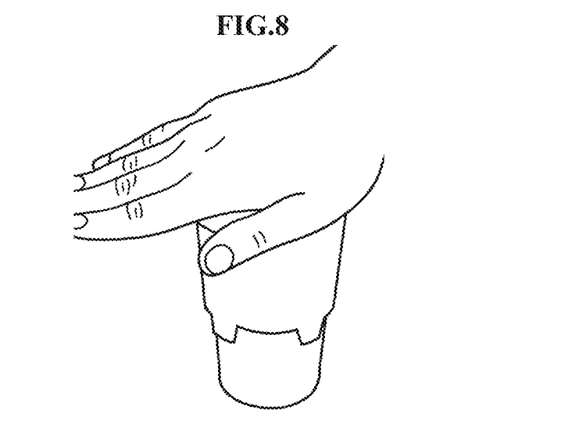
FIG. 8 illustrates a user gently pressing the container downward. As a result of this action, the blades denoted by the reference letter "B" in FIG. 1 attached to the bottom of the container cut the food in the pet food can into portions.
Figure 9:
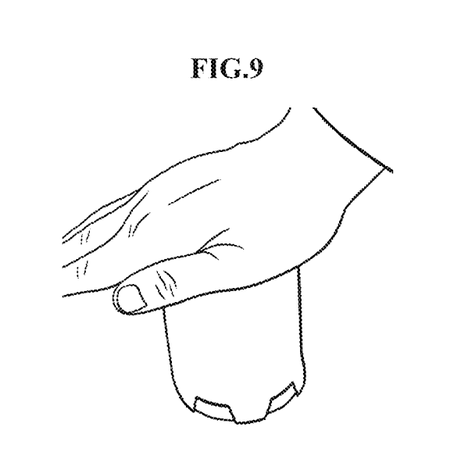
FIG. 9 illustrates the container being pressed fully down until it contacts the bottom of the lid-opened pet food can.

After the step described in paragraph [0042], the user gently presses the container (as described in paragraph [0037]) downward using the palm until the container reaches the bottom of the pet food can. This action is illustrated in FIGS. 8 and 9.

Figure 10:
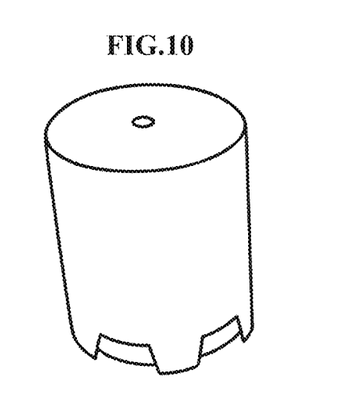
FIG. 10 illustrates a view in which the lid-opened pet food can is fully inserted into the container, with the container oriented in an inverted (upside-down) position.

Upon completion of the step described in paragraph [0043], the pet food can is fully inserted into the upside-down container referenced in paragraph [0037]. This condition is illustrated in FIG. 10.

Figure 11:
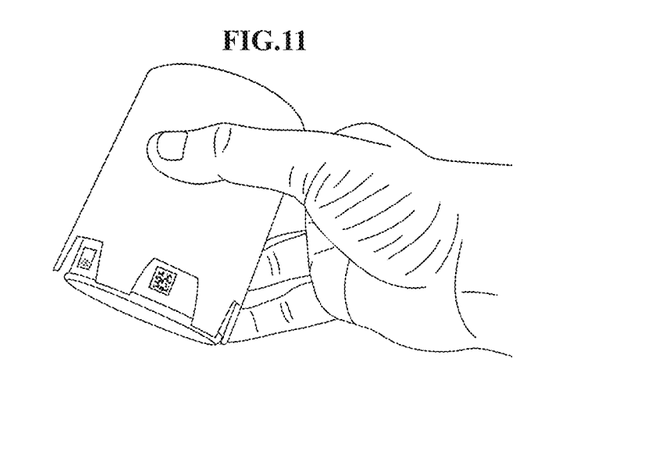
FIG. 11 illustrates an intermediate step in which a user flips the container from an inverted (upside-down) position to a right-side-up orientation.
Figure 12:
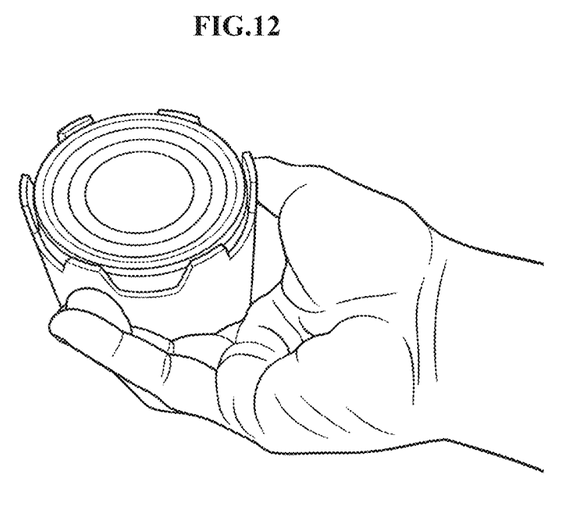
FIG. 12 illustrates a subsequent step in which the user continues to stabilize the container in its right-side-up orientation after completing the flipping motion.
Figure 13:
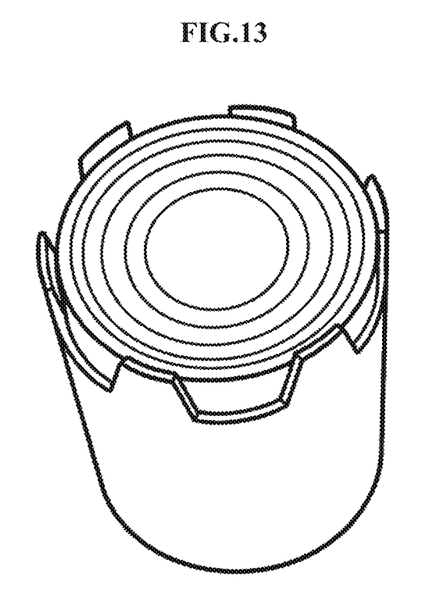
FIG. 13 illustrates a view showing the bottom of the lid-opened pet food can positioned inside the container, wherein the container is in an upright orientation and the pet food can is inverted.

The container, now holding the inverted can, is then flipped by hand so that the bottom of the pet food can becomes visible. These actions are illustrated in FIGS. 11, 12, and 13.

Figure 14:
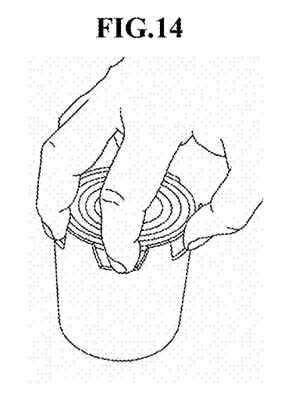
FIG. 14 illustrates a user inserting fingers into the finger gap arrangement provided in the container to securely grip the bottom of the inverted pet food can. The finger gaps are denoted by the reference letter "G" in FIG. 1. A total of six such gaps are provided around the periphery of the container, allowing the user to insert all fingers of one hand for improved grip and control when extracting the inverted pet food can.
Figure 15:
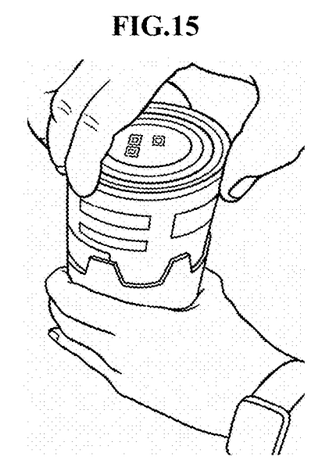
FIG. 15 illustrates the user extracting the inverted, lid-opened pet food can from the container by applying upward force through the fingers inserted into the finger gaps.

Following the step described in paragraph [0045], the user places fingers around the bottom of the inserted pet food can using the designated finger gaps on the container (as described in paragraph [0037]). The can is gently pulled out; if necessary, slight tapping or twisting of the can may be applied. These actions are illustrated in FIGS. 14 and 15.

Figure 16:
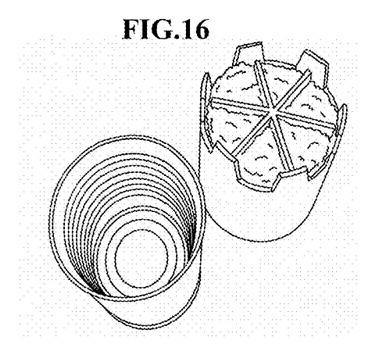
FIG. 16 illustrates that the semi-solid pet food originally contained in the pet food can has been divided into equal portions and deposited into the individual compartments of the container. The pet food can is depicted as empty.
Figure 17:
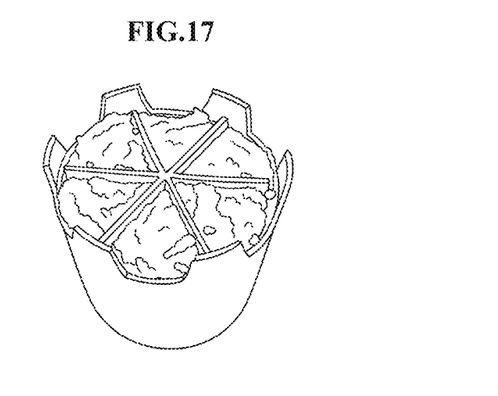
FIG. 17 illustrates the equal food portions settled within the individual compartments of the container as a result of the hands-free transfer process.
Figure 18:
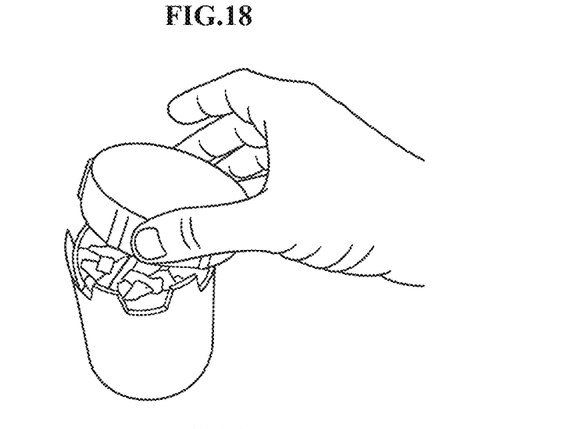
FIG. 18 illustrates a user placing a cap onto the container to seal the food portions within the individual compartments for storage.
Figure 19:
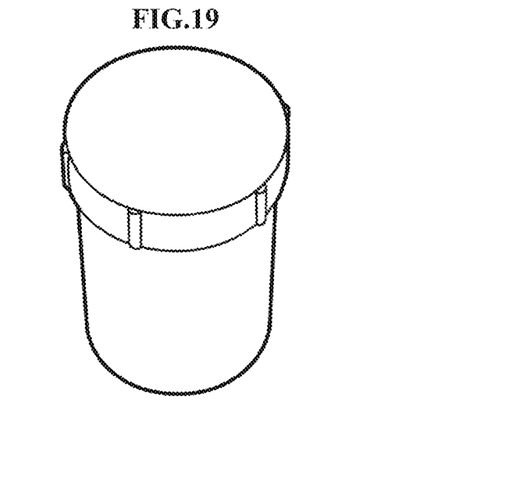
FIG. 19 illustrates the container with food portions sealed by the cap and prepared for placement in a household refrigerator.

As a result of the step described in paragraph [0046], the semi-solid food within the can is divided into equal portions, which remain inside the container described in paragraph [0037]. This outcome is illustrated in FIGS. 16 and 17.

The sequential execution of the actions described in paragraphs [0042] through [0047] constitutes a method for dividing the contents of a pet food can into equal portions without the use of knives or other kitchen utensils, and for transferring the divided portions into a reusable container in a hands-free manner.

The method involving the container described in paragraph [0037], along with the steps outlined in paragraph [0048], addresses the problem identified in paragraph [0008] by enabling simple division of pet food into equal portions. This allows users to feed pets an appropriate number of portions in accordance with veterinarian-recommended serving sizes.

The same method further addresses the issue described in paragraph [0009] by allowing the container described in paragraph [0037] to be sealed with a lid, thereby preventing odor leakage and spillage within household refrigerators.

The method also mitigates the moisture retention problem described in paragraph [0010] through the use of a lid placed on the container referenced in paragraph [0037].

Finally, the method solves the problem identified in paragraph [0011], as the container described in paragraph [0037] is constructed from food-grade, FDA-approved materials that are compatible with both microwave and dishwasher use.

The invention claimed is:

1. A method of dividing pet food in a can of pet food into equal portions using a specialized container, the method comprising:
    providing the specialized container wherein the specialized container comprises an outer cylindrical side wall, a closed bottom wall, an open top and a plurality of blades dividing an inner volume of the specialized container into equal portions wherein the plurality of blades extend from the closed bottom wall and wherein a space is formed between outer edges of the plurality of blades and an inner surface of the cylindrical sidewall; the specialized container further comprising a plurality of finger gaps along an upper edge of the open top;
    opening a can of pet food;
    placing the open top of the specialized container over an open top of the can of pet food;
    inserting the can of pet food into the specialized container by pressing the specialized container downward such that the plurality of blades enter into the pet food in the can of pet food and walls of the can of pet food enter into the space between the outer edges of the plurality of blades and the inner surface of the cylindrical sidewall;
    removing the can of pet food from the specialized container by grasping the can of pet food through the plurality of finger gaps in the specialized container whereby portions of the pet food remain in the specialized container between the plurality of blades.

2. The method of dividing food in a can of pet food into equal portions defined in claim 1, and further comprising sealing the open top of the specialized container with the pet food therein with a cap.

* * * * *